(12) United States Patent
Yamamura et al.

(10) Patent No.: US 7,398,542 B2
(45) Date of Patent: Jul. 8, 2008

(54) PROGRAM RECORDING AND VIEWING RESERVATION SYSTEM AND METHOD THEREOF

(75) Inventors: Gaku Yamamura, Tokorozawa (JP); Tsutomu Takahashi, Tokorozawa (JP); Tsuyoshi Hasebe, Tokorozawa (JP); Kazutomo Watanabe, Tokorozawa (JP); Yoshitaka Tanaka, Tokorozawa (JP); Yasuo Shirosaki, Tokorozawa (JP); Ryuichiro Morioka, Tokorozawa (JP); Masao Higuchi, Tokorozawa (JP); Katsutoshi Inagaki, Tokorozawa (JP); Kunihiro Minoshima, Tokorozawa (JP)

(73) Assignee: Pioneer Corporation, Tokyo (JP)

( * ) Notice: Subject to any disclaimer, the term of this patent is extended or adjusted under 35 U.S.C. 154(b) by 1346 days.

(21) Appl. No.: 10/314,258

(22) Filed: Dec. 9, 2002

(65) Prior Publication Data

US 2003/0115604 A1   Jun. 19, 2003

(30) Foreign Application Priority Data

Dec. 18, 2001  (JP) .............................. 2001-384083

(51) Int. Cl.
  *H04N 5/455* (2006.01)
(52) U.S. Cl. .............................. 725/55; 725/40; 725/58
(58) Field of Classification Search .................... 725/40, 725/55, 58
See application file for complete search history.

(56) References Cited

U.S. PATENT DOCUMENTS

| | | | | |
|---|---|---|---|---|
| 5,343,450 A | * | 8/1994 | Hamoda et al. ................ | 369/19 |
| 5,686,954 A | * | 11/1997 | Yoshinobu et al. ............ | 725/43 |
| 6,751,401 B1 | * | 6/2004 | Arai et al. ..................... | 386/83 |
| 2002/0120504 A1 | * | 8/2002 | Gould et al. .................. | 705/14 |

FOREIGN PATENT DOCUMENTS

| | | |
|---|---|---|
| EP | 0 836 320 | 4/1998 |
| JP | 10-188390 | 7/1998 |
| JP | 11-234585 | 8/1999 |
| JP | 11-284922 | 10/1999 |
| JP | 11-308539 | 11/1999 |
| JP | 2000-295558 | 10/2000 |
| JP | 2001-36846 | 2/2001 |
| JP | 2001-119639 | 4/2001 |

* cited by examiner

*Primary Examiner*—Kieu-Oanh Bui
(74) *Attorney, Agent, or Firm*—Drinker Biddle & Reath LLP (57) ABSTRACT

A method for reserving recording and viewing a broadcast program on a display screen includes the steps of extracting a broadcast program timetable; simultaneously displaying the broadcast program timetable and a viewing reservation timetable; waiting for a selection input to select a broadcast program on the display screen; waiting for an allocation input to allocate a selected program into the viewing reservation timetable; and generating recording instruction to instruct recording of the selected program and reproduction reservation instruction to instruct reproduction of the selected program at a time corresponding to a position at which the selected program is allocated in the viewing reservation timetable.

14 Claims, 9 Drawing Sheets

PROGRAM RECORDING AND VIEWING RESERVATION SYSTEM AND METHOD THEREOF

BACKGROUND OF THE INVENTION

1. Field of the Invention

The present invention relates to a program recording and viewing reservation system for performing recording and viewing reservation of a broadcast program on a display screen and a method thereof.

2. Description of the Related Art

In order for a user to select a TV program to be viewed, it is usual to view a TV program listing page on a newspaper or a TV program information magazine. Alternatively, there is a site for servicing a TV program listing on a WEB page of Internet in recent years, so that the user may see the TV program listing by a terminal device such as a personal computer or the like. Further, an electronic program guide referred to as EPG (Electronic Program Guide) is broadcasted in the digital TV broadcasting together with a TV program, so that, if the user employs a digital broadcasting-compatible TV receiving set, it is also possible to fetch out the electronic program guide from a broadcast wave by the remote control and display it on a TV screen. In the case that the electronic program guide and the TV program listing are displayed on a monitor screen such as a TV screen or the like, the TV program listing constituted in the same manner as that of the TV program listing which is shown in the TV program listing page of the newspaper is employed.

However, conventionally, the user reserved recording of a program which was selected from the electronic program guide (EPG) and viewed the recorded program (content) which was selected from a content list or the like. Accordingly, there was no means to easily realize a series of reservation operation from recording of the program till viewing it by the user friendly operation, for example, automatically recording a program which was broadcasted at a time when the user could not view it and automatically reproducing it at a time when the user wished to view it.

OBJECT AND SUMMARY OF THE INVENTION

The present invention has been made in view of the foregoing problems, and it is an object of the present invention to provide a recording and viewing reservation system for reserving recording and viewing a broadcast program on a display screen and a method thereof allowing to easily realize a series of reservation operation from recording of the program till viewing it by the user friendly operation.

To achieve the object, according to one aspect of the present invention, there is provided a method for reserving recording and viewing a broadcast program on a display screen, which comprises the steps of extracting a broadcast program timetable that is transmitted from a broadcast station; simultaneously displaying the broadcast program timetable and a viewing reservation timetable on the display screen; waiting for a selection input to select a broadcast program in the broadcast program timetable on the display screen; waiting for an allocation input to allocate the broadcast program which is selected on the display screen into the viewing reservation timetable in response to the selection input; and generating recording instruction data to instruct recording of a selected broadcast program and reproduction reservation instruction data to instruct reproduction of the selected program at a time corresponding to a position at which the selected program is allocated in the viewing reservation timetable in response to the allocation input.

According to another aspect of the present invention, there is provided a recording and viewing reservation apparatus for performing reservation of recording and viewing a broadcast program on a display screen, which comprises an extractor which extracts a broadcast program timetable that is transmitted from a broadcast station; a display unit which simultaneously displays the broadcast program timetable and a viewing reservation timetable on the display screen; a selection receiver which receives a selection input to select a broadcast program in the broadcast program timetable on the display screen; an allocation receiver which receives an allocation input to allocate the broadcast program which is selected on the display screen into the viewing reservation timetable in response to the selection input; and a data generator which generates recording instruction data to instruct recording of a selected broadcast program and reproduction reservation instruction data to instruct reproduction of the selected program at a time corresponding to a position at which the selected program is allocated in the viewing reservation timetable in response to the allocation input.

DETAILED DESCRIPTION OF THE PREFERRED EMBODIMENT

The embodiments of the present invention will be described in detail with reference to the drawings.

Figure 1:
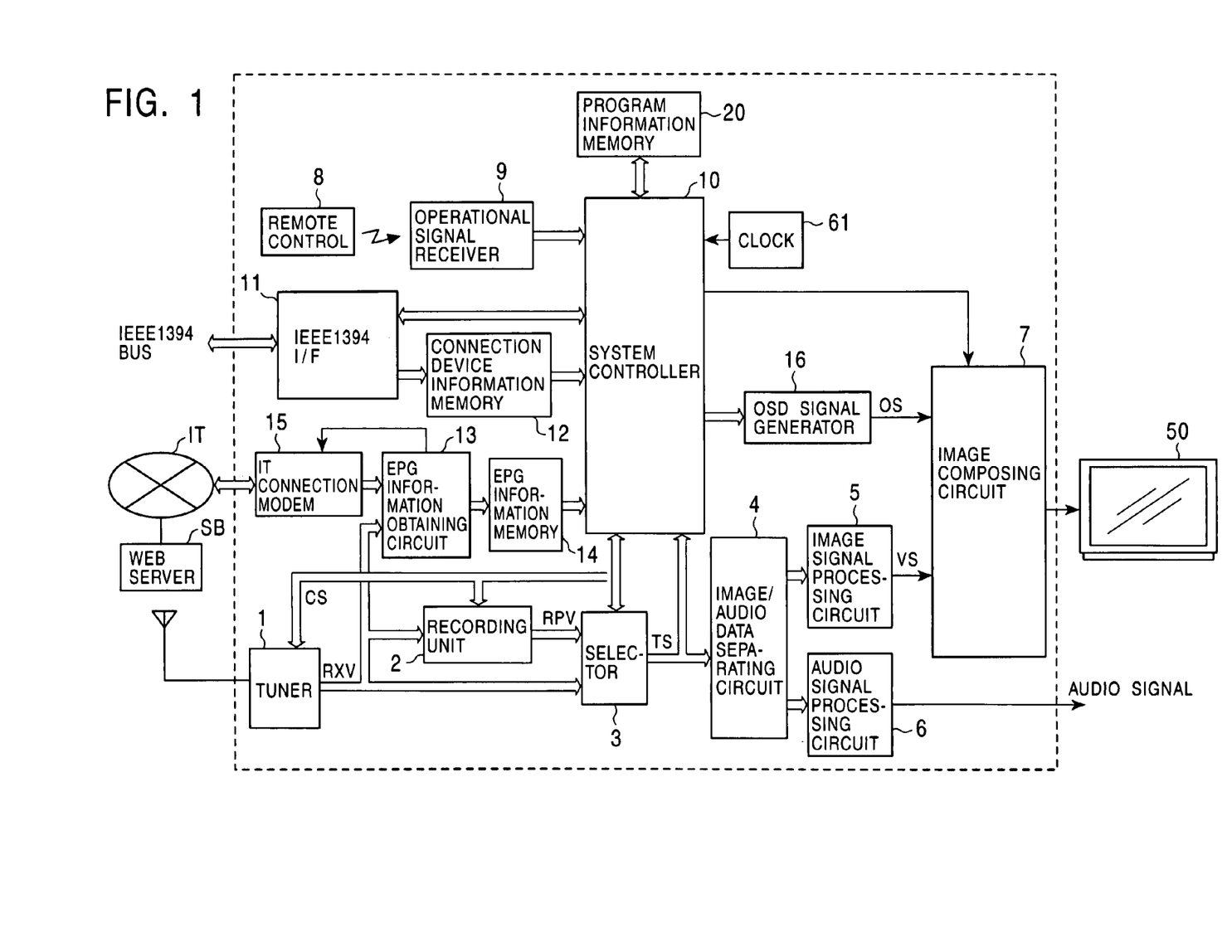
FIG. 1 is a block diagram for illustrating a schematic configuration (a part encircled by a broken line) of a recording apparatus in which a recording and viewing reservation system according to the present invention is mounted.

FIG. 1 is a block diagram for illustrating a schematic configuration (a part encircled by a broken line) of a recording apparatus in which a program recording and viewing reservation system according to the present invention is mounted.

If a channel selection signal is supplied from a system controller 10, a TV tuner 1 extracts a broadcast wave from a broadcast station which is designated by the channel selection signal among the TV broadcasting waves which are received through an antenna or a cable. As this broadcast wave, a satellite broadcast wave or a terrestrial broadcast wave may be conceived. Then, the TV tuner 1 obtains a receiving TV signal RXV by demodulating such a broadcast wave and outputs the TV signal. In a program recording unit 2, a magnetic disk, an optical disk, a magnetic tape or a semiconductor memory or the like are mounted as a built-in recording medium and the program recording unit 2 stores the foregoing TV signal RXV in the built-in recording medium in accordance with a program recording start instruction signal which has been supplied from the system controller 10. Alternatively, if a reproduction start instruction signal and a reproduction start address are supplied from the system controller 10, the program recording unit 2 reads the TV signal from a position which is indicated by the reproduction start address (i.e., a position within the recording medium) to supply the signal as a reproduction TV signal RPV to a selector 3. The selector 3 selects a signal in accordance with a selection signal which is supplied from the system controller 10 among the foregoing receiving TV signal RXV and the foregoing reproduction TV signal RPV and supplies the selected one as a TV signal TS to an image and audio (image/audio) data separating circuit 4 and the system controller 10. The image/audio data separating circuit 4 separates the TV signal TS into the image data and the audio data, respectively and supplies the image data to an image signal processing circuit 5 and the audio data to a audio signal processing circuit 6, respectively. The audio signal processing circuit 6 outputs an audio signal which is obtained by applying a predetermined audio demodulation process to the audio data. The image signal processing circuit 5 supplies an image signal VS, which is obtained by applying a predetermined image demodulation processing to the foregoing image data, to an image composing circuit 7.

A remote control 8 is provided with various command keys or buttons corresponding various instruction operations for a user. The remote control 8 transmits an operational signal in accordance with a command key that is operated by the user to an operational signal receiving circuit 9. The operational signal receiving circuit 9 receives the operational signal that has been transmitted from the remote control 8 so as to supply the signal to the system controller 10.

An IEEE1394 interface circuit 11 serves to transmit and receive the information to and from an information device that is connected to an IEEE1394 bus. The IEEE1394 interface circuit 11 fetches in the audio data, the image data and various operational instruction signals which are provided from the information device which is connected to the IEEE1394 bus so as to provide them to the system controller 10. Alternatively, the IEEE1394 interface circuit 11 packetizes a TV signal (including an MPEG TV signal) which is supplied from the system controller 10 and transmits to the IEEE1394 bus. Further, the IEEE1394 interface circuit 11 supplies the identification information data representing various devices which are connected to the IEEE1394 bus at the present moment and the device classifying information data representing a classification of various devices (for example, a digital video camera, a personal computer and a DVD recorder or the like) to a connection device information memory 12. The connection device information memory 12 stores the identification information data and the device classifying information data in association with the identification information data for supplying to the system controller 10.

An EPG information obtaining circuit 13 extracts the EPG information data among the receiving TV signals RXV when the EPG information data is superimposed in the receiving TV signal RXV which is outputted from the TV tuner 1. The EPG information data extracted in the EPG information obtaining circuit 13 is stored in an EPG information memory 14. The EPG information data includes a program name to be broadcasted, a date of broadcasting, a channel number, a genre of the program, a time zone or time frame of broadcasting, a content of the program and a keyword in association with the content of the program for each broadcast station. The genre of the program classifies the content of the program. For example, the program genre is news, sports, a drama, a movie, music, a children's program, animation, an educational program or an entertainment program. Alternatively, a keyword regarding content of a program is, for example, a cast, an author, a director, a name of series, a name of a piece or a locality. On the other hand, when the EPG information data is not superimposed in the receiving TV signal RXV, the EPG information obtaining circuit 13 transmits an EPG demand instruction to an Internet connection modem 15. The Internet connection modem 15 has access to a WEB server SB which is connected to the Internet (IT) in response to the EPG demand instruction. In the WEB server SB, the EPG information data is stored to indicate a name of a program to be broadcasted, a date of broadcasting, a channel number, a genre of the program, a time frame of broadcasting, a content of the program and a keyword in association with the content of the program or the like for each broadcast station. Further, in the WEB server SB, the program viewing-rate data representing the viewing rate of each program that was broadcasted in the past is stored. The WEB server SB transmits the EPG information data to the Internet connection modem 15 through the Internet IT by the above described access from the Internet connection modem 15. Then, the Internet connection modem 15 receives the EPG information data that has been transmitted through the Internet IT and supplies the data to the EPG information obtaining circuit 13. In this instance, the EPG information obtaining circuit 13 makes an EPG information memory 14 store the EPG information data that has been supplied from the Internet connection modem 15.

Additionally, the EPG information obtaining circuit 13 periodically transmits the program viewing-rate data demand instruction to the Internet connection modem 15. The Internet connection modem 15 has access to the WEB server SB that is connected to the Internet IT in response to the program viewing-rate data demand instruction. Therefore, the EPG information obtaining circuit 13 fetches in the program viewing-rate data that was hold in the WEB server SB for storing in the EPG information memory 14.

On the basis of various display data that was supplied from the system controller 10, an OSD (On Screen Display) signal generation circuit 16 generates an OSD image signal (OS) in order to display an image carried by the display data on a screen of a display device 50 to supply it to the image composing circuit 7. The image composing circuit 7 supplies the image signal VS with the OSD image signal OS superimposed thereon or any one of the image signal VS and the OSD image signal OS to the display device 50 as a final image signal in response to an image composition control signal to be supplied from the system controller 10. The display device 50 displays the image on the basis of the image signal on the screen.

The system controller 10 is connected to a clock 61 having a timer and a calendar function. The system controller 10 controls a program information memory 20 to store the information data with regard to the program which has been recorded in the program recording unit 2. More in detail, various program recording information data such as the EPG information data with regard to the recorded program and a time required for the program recording or the like are stored as being associated with each other.

Figure 2:
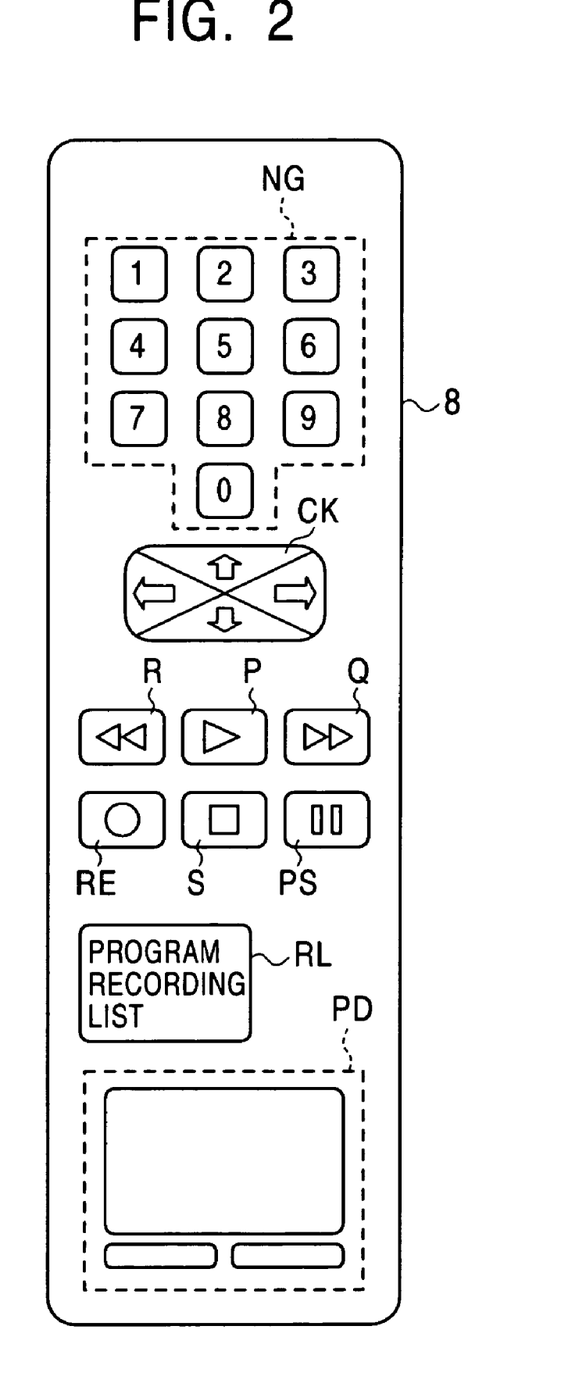
FIG. 2 is a view for showing a portion of a remote control having command keys.

FIG. 2 is a view showing a panel of a remote control 8 having command buttons or keys.

In FIG. 2, on the operational panel, a numeral button group NG for designating a channel for the TV tuner 1 or inputting various numeric values and a cursor key CK for moving a cursor to be displayed on the screen of the display device 50 to an arbitrary position are provided. On the operational panel, a reproduction button P for receiving various program recording and reproducing operations by the program recording unit 2, a fast forward button Q, a rewind button R, a pause button PS, a stop button S and a recording button RE are provided. Further, on the operational panel, a recording list button RL for displaying a list of a program that has been recorded by the program recording unit 2 is provided. Additionally, a pointing device PD is provided on the operational panel to move a pointer on the display screen and thereby, it is possible to perform the operation such as click and drug and drop or the like as same as a mouse of a personal computer (PC).

The remote control 8 generates an operational signal in association with the command buttons to be operated by the user and transmits the operational signal to the operational signal receiving circuit 9. Then, the operational signal receiving circuit 9 supplies the operational signal to the system controller 10.

The system controller 10 carries out the control in association with the operational signals to be transmitted from the remote control 8 through the operational signal receiving circuit 9.

A scheduling function with regard to the program recording, reproduction and viewing to be carried out by the system controller 10 will be described below.

Figure 3:
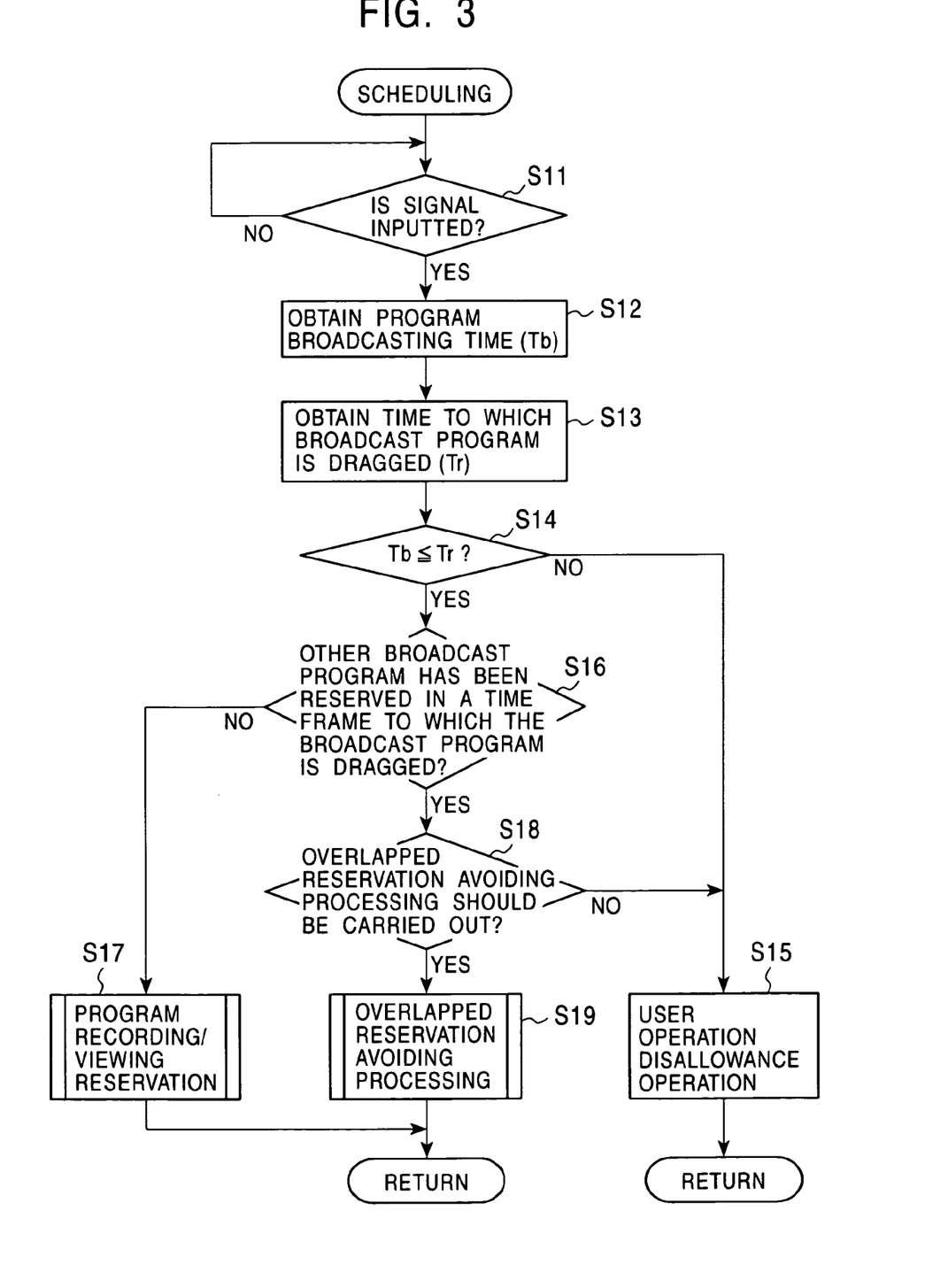
FIG. 3 is a flow chart for showing a processing procedure of the scheduling operation.
Figure 4:
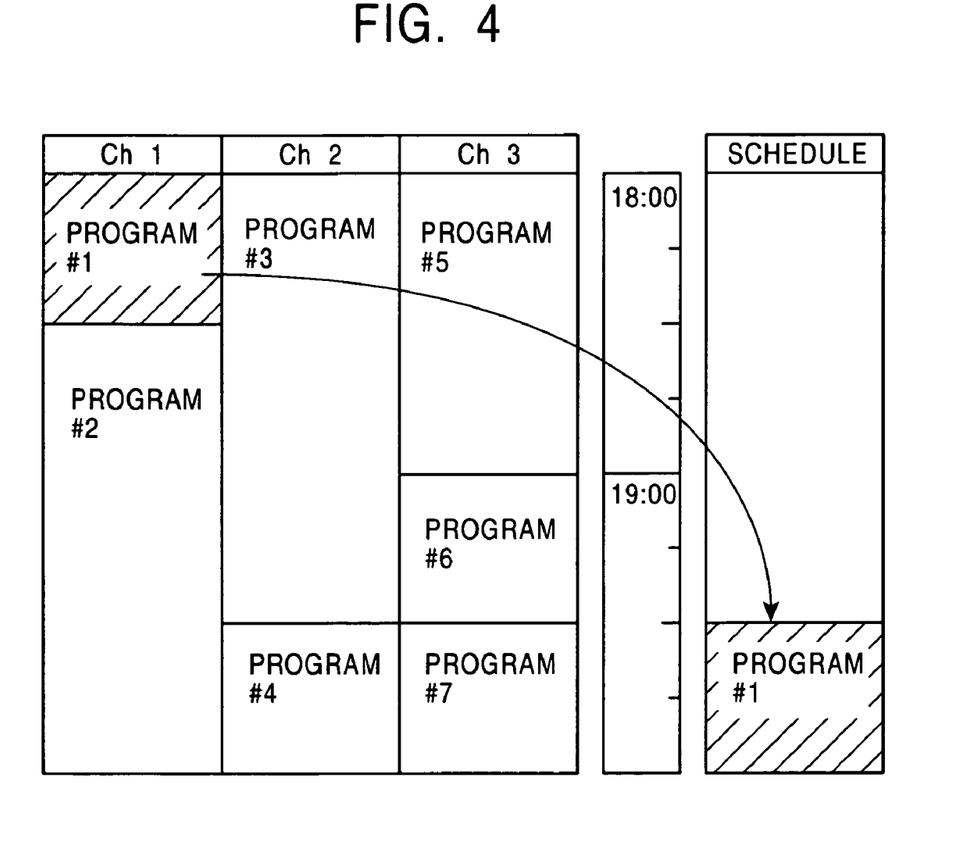
FIG. 4 is a view for showing a display screen on which EPG and a viewing schedule list are displayed.

FIG. 3 is a flow chart for showing a processing procedure of the scheduling operation. The EPG and the viewing schedule list are displayed on the screen of the display device 50 as is shown in FIG. 4. On the basis of the operational signal transmitted from the remote control 8 by the user's operation, the program scheduled to be broadcasted that the user desires to reserve recording and viewing thereof is dragged and dropped (hereinafter, simply referred to as to be "dragged") within the viewing schedule list. The system controller 10 waits for input of a signal in accordance with the drag and drop (step S11) and if the signal is inputted, the system controller 10 proceeds to a next step. For example, in a case shown in FIG. 4, a program scheduled to be broadcasted from 18:00 to 18:30 (i.e., a program No. 1, at a first channel (Ch1)) is selected to be dragged in a time frame of 19:30 to 20:00 in the viewing schedule list and be allocated there. According to this operation, the user intends to record this broadcast program and view it at a time frame into which the program is dragged. Additionally, this operation corresponds to moving or copying of an object corresponding to this program on a screen. The system controller 10 obtains a broadcasting time Tb, which is a time when the program is broadcasted, of the broadcast program on the basis of a drag operation signal showing the operation (step S12). Further, the system controller 10 obtains a viewing time Tr, which is a time of viewing the program, corresponding to a position in the viewing schedule list (step S13). For example, these times are shown by using a start time as Tb=18:00, Tr=19:30.

Then, the broadcasting time Tb is compared to the viewing time Tr (step S14). When the viewing time Tr is in advance of the broadcasting time Tb (written as Tb>Tr), assuming that the user's drag operation cannot be allowed, the user operation disallowance processing is carried out to reject the user's operation (step S15). For example, according to this processing, it is not possible for the user to drag and drop the broadcast program in the viewing schedule list.

In step S14, in the case that the viewing time Tr is later or equal to the broadcasting time Tb (described as Tb≦Tr), it is determined whether or not a necessary time frame has been already reserved in a destination of the drag (namely, in FIG. 4, 19:30 to 20:00), namely, whether or not there is a viewing reservation of which time frame overlaps even partly the present time frame (step S16). This determination is carried out by obtaining the reservation times of the viewing reservations in the viewing schedule list and determining whether or not the reservation times overlap the present time frame. The determination may be carried out by using other method, for example, a graphic process, a graphic use interface or the like to determine the overlap of the objects representing the broadcast program and the programs which are reserved on the screen. In step S16, when it is determined that there is no viewing reservation overlapping the time frame to which the broadcast program has been dragged, a program recording/viewing reservation subroutine is carried out (step S17).

Figure 5:
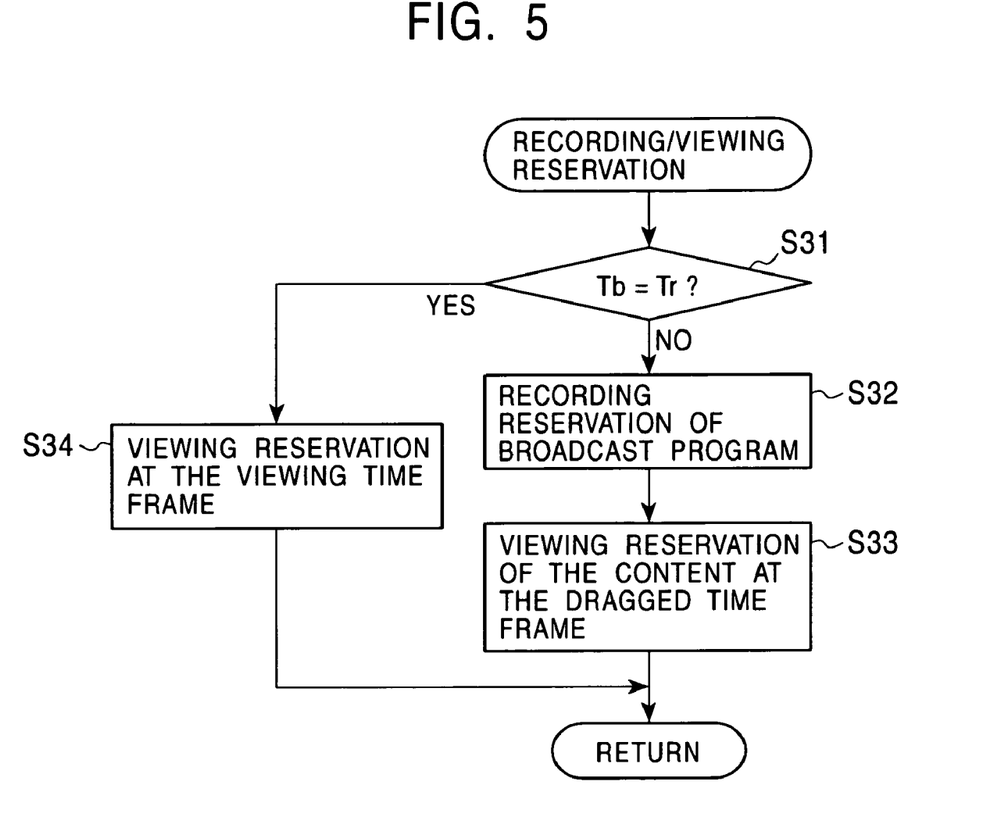
FIG. 5 is a flow chart for showing a processing procedure of a program recording/viewing reservation subroutine.

FIG. 5 is a flow chart for showing a processing procedure of such a program recording/viewing reservation subroutine. At first, it is determined whether or not the viewing time Tr is equal to the broadcasting time Tb (Tb=Tr) (step S31). In the case that it is determined that they are not equal, the recording of the broadcast program is reserved (step S32). Then, viewing reservation is performed for the program, of which recording has been reserved, at the time frame to which the broadcast program is dragged (step S33). In addition, the screen display processing is carried out in accordance with the viewing reservation. For example, as shown in FIG. 4, the recording of the broadcast program#1 is reserved, the viewing reservation is made so that the recorded broadcast program#1 will be viewed from 19:30 and it is displayed that the viewing of the recorded broadcast program#1 is reserved at the viewing time frame.

In step S31, in the case that the viewing time Tr is equal to the broadcasting time Tb, the viewing reservation is carried out at the viewing time frame (step S34). It should be noted that the broadcast program may be recorded at the same viewing time frame. In this case, it is also possible to view the broadcast program at a later time once again as a recorded content. According to the above-described processes, the present subroutine is finished.

In step S16 (FIG. 3), in the case that there is a viewing reservation which overlaps with the time frame to which the broadcast program has been dragged, it is determined whether or not a double reservation avoiding processing is performed (step S18). When it is determined that a double reservation avoiding processing is not performed, the user operation disallowance operation is carried out (step S15) and the present routine is finished. When it is determined that a double reservation avoiding processing is performed, a double reservation avoiding subroutine is carried out (step S19).

Figure 6:
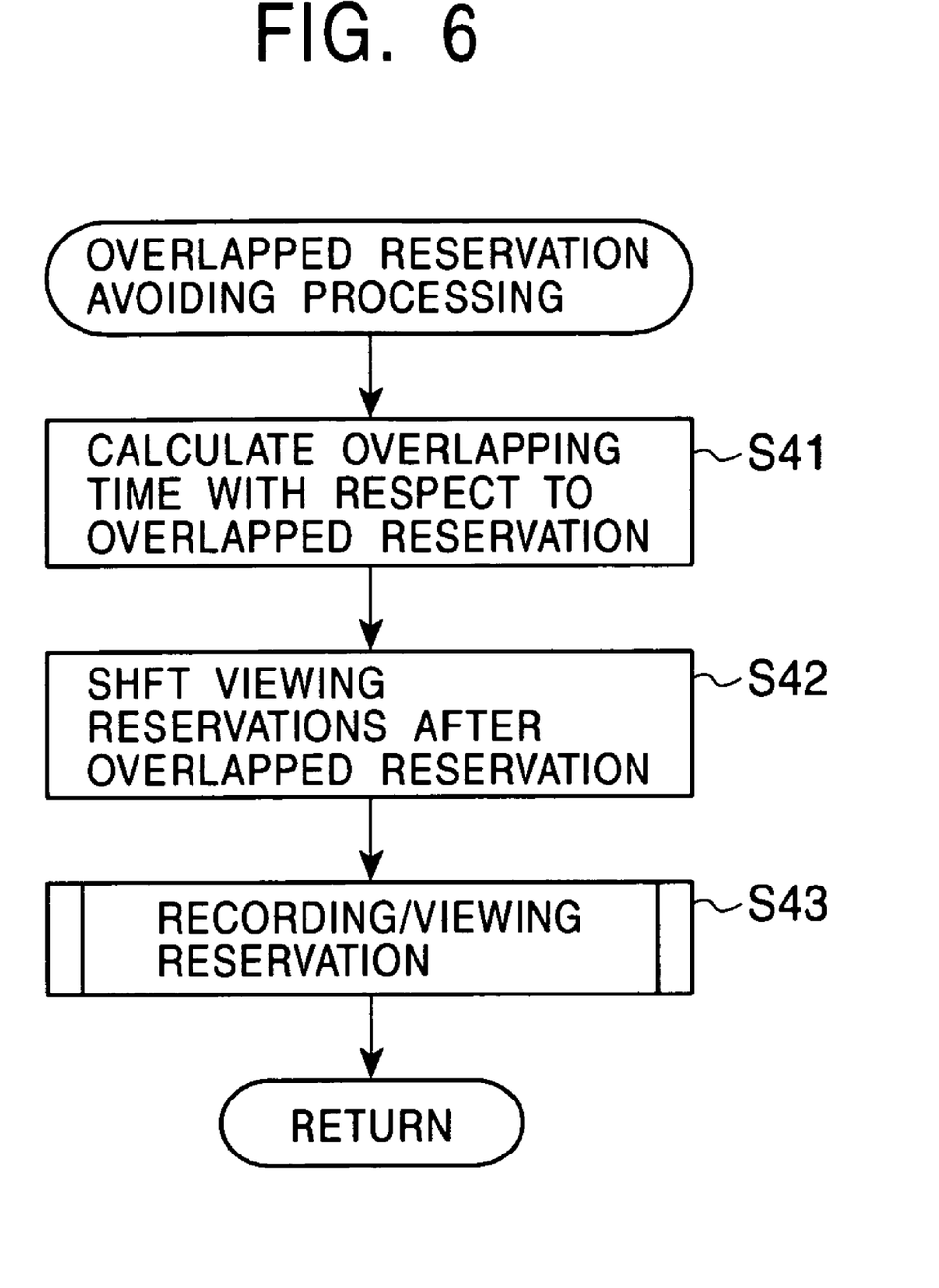
FIG. 6 is a flow chart for showing a processing procedure of a subroutine for avoiding a double reservation.
Figure 7:
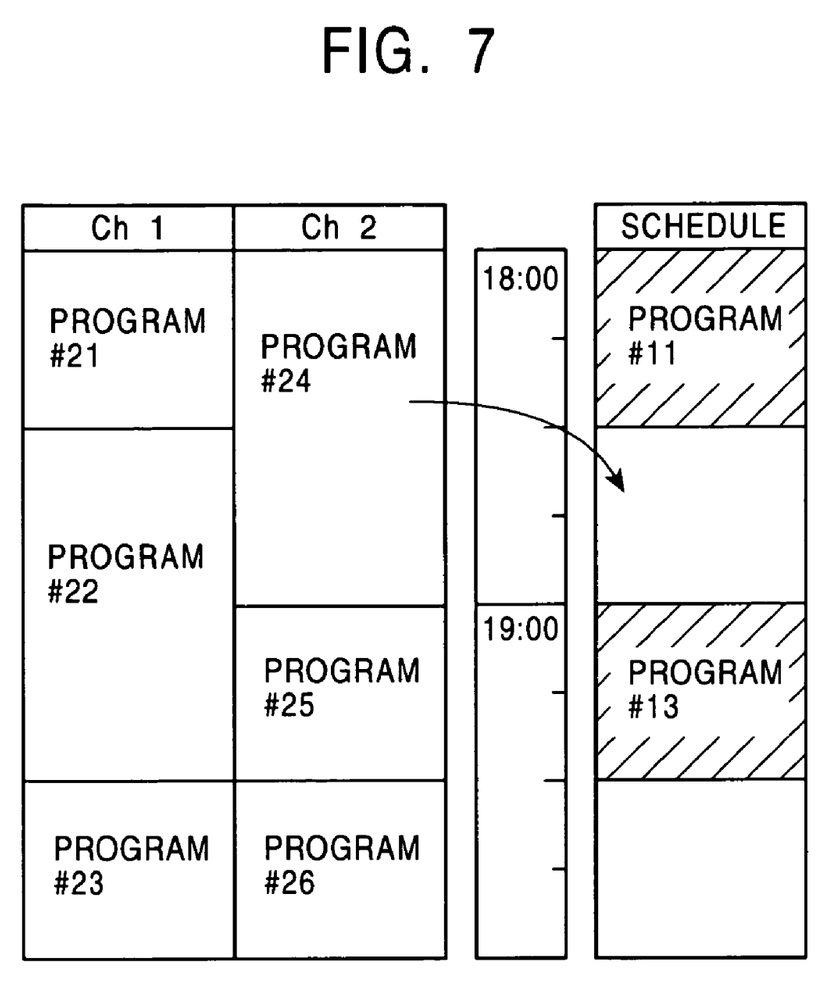
FIG. 7 shows a display screen for illustrating a process of a subroutine for avoiding a double reservation.
Figure 8:
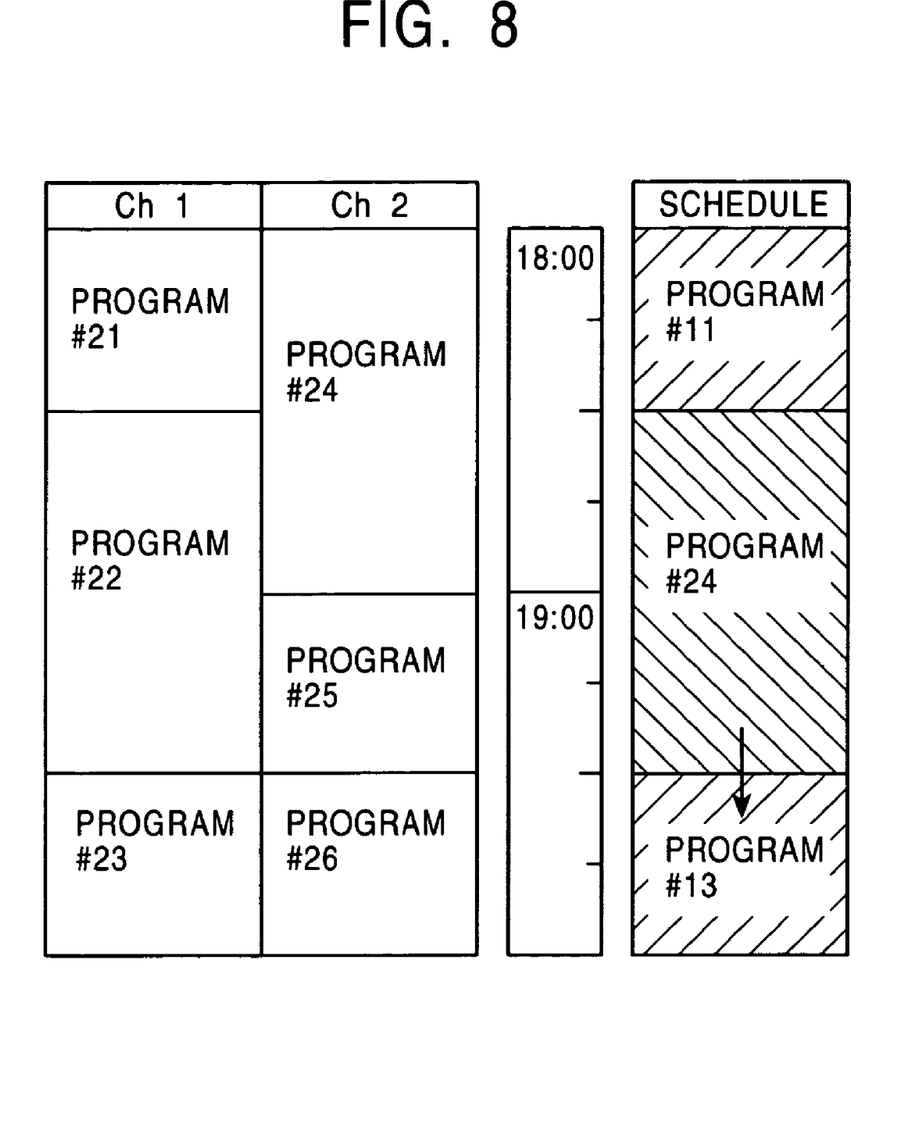
FIG. 8 shows a display screen for illustrating a process for delaying the viewing reservation in a subroutine for avoiding a double reservation.

FIG. 6 is a flow chart for showing a processing procedure of the subroutine for avoiding a double reservation. In the first step, each time frame of a dragged broadcast program that the user desires to reserve the viewing thereof and the broadcast program in the viewing schedule list of which viewing has been reserved and which overlaps the broadcast program, namely, the start times and the finish times of the broadcast programs are obtained, so that the overlapping time is calculated and obtained (step S41). For example, FIG. 7 shows a display screen for this instance. In the case where the broadcast programs#11 and #13 have been already reserved, the overlapping time of a broadcast program#24 to be reserved and the broadcast program#13 is calculated and obtained. Then, as shown in FIG. 8, all viewing reservations after the overlapping reservation (the broadcast program#13) are delayed by the calculated overlapping time (step S42). Then, the program recording/viewing reservation subroutine is carried out (step S43). In other words, similar to the above described processes, the recording of the broadcast program#24 is reserved and the viewing thereof is reserved at the time frame to which this broadcast program is dragged.

Figure 9:
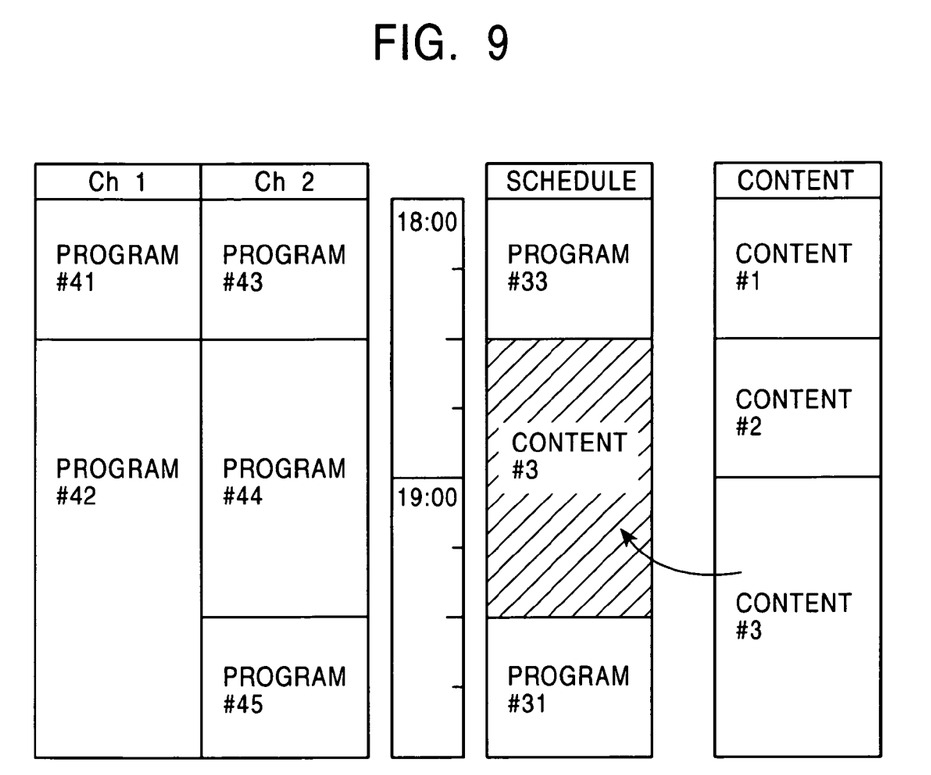
FIG. 9 is a view for showing a display screen according to other embodiment of the present invention.

FIG. 9 is a view for showing a display screen according to other embodiment of the present invention. According to the embodiment, in addition to the above described EPG and the viewing schedule list, a content list as a list of the recorded programs or the recorded image data (i.e., contents) is also displayed. According to the above described embodiment, a case has been described such that the viewing reservation of the broadcast program is performed in the viewing schedule list. However, it is possible to reserve the viewing of the contents in the content list by dragging them in the viewing schedule list. In other words, in the case that the viewing of broadcast programs#33 and #31 has been already reserved, it is possible to perform viewing reservation thereof by dragging a content #3 from the content list in the viewing schedule list.

In this case, it is possible to perform viewing reservation by the same process as those of the above described embodiments. More specifically, it is possible to insert a desired content in a desired time frame by performing the above described double reservation avoiding processing.

Alternatively, the above described embodiments are described by taking a case of selecting the recorded program and allocating it in the viewing schedule list by a drag and drop operation using a pointing device as an example. However, the present invention is not limited to this and the same operation may be carried out by using a cursor key or other device.

As described above, a series of reservation operation, i.e., from recording of the program till viewing it, can be performed by the user-friendly operation.

The invention has been described with reference to the preferred embodiments thereof. It should be understood by those skilled in the art that a variety of alterations and modifications may be made from the embodiments described above. It is therefore contemplated that the appended claims encompass all such alterations and modifications.

This application is based on Japanese Patent Application No. 2001-384083 which is hereby incorporated by reference.

What is claimed is:

1. A method for reserving recording and viewing a broadcast program on a display screen, comprising the steps of:
    extracting a broadcast program timetable that is transmitted from a broadcast station;
    displaying said broadcast program timetable and a viewing reservation timetable on said display screen;
    waiting for a selection input to select a broadcast program in said broadcast program timetable on said display screen;
    waiting for an allocation input to allocate the broadcast program which is selected on said display screen into said viewing reservation timetable in response to said selection input; and
    generating, in response to said allocation input, recording reservation instruction data and reproduction reservation instruction data, wherein the recording reservation instruction data instructs to perform a recording reservation of a selected broadcast program, and wherein the reproduction reservation instruction data instructs to perform a reproduction reservation of a broadcast program of which the recording reservation has been instructed at a time corresponding to a position at which the selected program is allocated in said viewing reservation timetable.

2. A method according to claim 1, further comprising the step of determining whether or not a broadcast time frame of the selected broadcast program is equal to a time frame which is allocated to said viewing reservation timetable;
    wherein the step of generating generates viewing reservation instruction data to instruct to view the selected program when it is determined that a broadcast time frame of the selected broadcast program is equal to a time frame which is allocated to said viewing reservation timetable in the step of determining.

3. A method according to claim 2, further comprising the steps of:
    detecting overlapping of a reproduction time frame of a program of which the recording reservation has been performed and a reproduction time frame of a broadcast program that any of the reproduction reservation and the viewing reservation has been already carried out; and
    changing a reservation time frame of the program of which reservation has been already carried out so as to avoid the overlapping when the overlapping of the reproduction time frames and the reproduction time frame is detected in the step of detecting.

4. A method according to claim 1, further comprising the steps of:
    displaying a recorded broadcast program list on said display screen in conjunction with said viewing reservation timetable;
    waiting for selection input for selecting a recorded broadcast program from said recorded broadcast program list on said display screen; and
    waiting for allocation input for allocating the recorded broadcast program which is selected on said display screen in said viewing reservation timetable in response to said selection input;
    wherein the step of generating generates reproduction reservation instruction data to instruct to reproduce the selected recorded broadcast program at a time corresponding to a position at which the selected recorded broadcast program is allocated in said viewing reservation timetable.

5. A method according to claim 1, wherein said selection input and said allocation input are carried out by the drag and drop operation on said display screen.

6. A method according to claim 1, wherein the step of generating generates the reproduction reservation instruction data prior to the performance of recording of the program of which recording reservation has been carried out.

7. A method according to claim 1, wherein the step of displaying displays said broadcast program timetable and a viewing reservation timetable on said display screen simultaneously.

8. A recording and viewing reservation apparatus for performing reservation of recording and viewing a broadcast program on a display screen, comprising:
    an extractor which extracts a broadcast program timetable that is transmitted from a broadcast station;
    a display unit which simultaneously displays said broadcast program timetable and a viewing reservation timetable on said display screen;
    a selection receiver which receives a selection input to select a broadcast program in said broadcast program timetable on said display screen;
    an allocation receiver which receives an allocation input to allocate the broadcast program which is selected on said display screen into said viewing reservation timetable in response to said selection input; and a data generator which generates, in response to said allocation input, recording reservation instruction data and reproduction reservation instruction data, wherein the recording reservation instruction data instructs to perform a recording reservation of a selected broadcast programs, and wherein the reproduction reservation instruction data instructs to perform a reproduction reservation of a broadcast program of which the recording reservation has been instructed at a time corresponding to a position at which the selected program is allocated in said viewing reservation timetable.

9. A reservation apparatus according to claim 8, further comprising a determination unit which determines whether or not a broadcast time frame of the selected broadcast program is equal to a time frame which is allocated to said viewing reservation timetable;

wherein said data generator generates viewing reservation instruction data to instruct to view the selected program when it is determined that a broadcast time frame of the selected broadcast program is equal to a time frame which is allocated to said viewing reservation timetable in said determination unit.

10. A reservation apparatus according to claim 9, further comprising:

a detector which detects overlapping of a reproduction time frame of a program of which the recording reservation has been performed and a reproduction time frame of a broadcast program that any of the reproduction reservation and the viewing reservation has been already carried out; and a changing unit which changes a reservation time frame of the program of which reservation has been already carried out so as to avoid the overlapping when the overlapping of the reproduction time frames and the reproduction time frame is detected in said detector.

11. A reservation apparatus according to claim 8, further comprising:

a displaying unit which displays a recorded broadcast program list on said display screen in conjunction with said viewing reservation timetable;

a recorded program selection receiver which receives a recorded program selection input for selecting a recorded broadcast program from said recorded broadcast program list on said display screen; and a recorded program allocation receiver which receives an input for allocating the recorded broadcast program which is selected on said display screen in said viewing reservation timetable in response to said recorded program selection input;

wherein said generator generates reproduction reservation instruction data to instruct to reproduce the selected recorded broadcast program at a time corresponding to a position at which the selected recorded broadcast program is allocated in said viewing reservation timetable.

12. A reservation apparatus according to claim 8, wherein said selection input and said allocation input are carried out by the drag and drop operation on said display screen.

13. A reservation apparatus according to claim 8, wherein the data generator generates the reproduction reservation instruction data prior to the performance of recording of the program of which recording reservation has been carried out.

14. A reservation apparatus according to claim 8, wherein the display unit displays said broadcast program timetable and a viewing reservation timetable on said display screen simultaneously.

* * * * *